United States Patent [19]

Schneider et al.

[11] Patent Number: 5,245,067

[45] Date of Patent: Sep. 14, 1993

[54] PROCESS FOR THE PURIFICATION OF ORGANOPOLYSILOXANES

[75] Inventors: Otto Schneider, Burghausen; Johann Schuster, Emmerting; Ludwig Hager, Burghausen, all of Fed. Rep. of Germany

[73] Assignee: Wacker-Chemie GmbH, Munich, Fed. Rep. of Germany

[21] Appl. No.: 906,054

[22] Filed: Jun. 29, 1992

[30] Foreign Application Priority Data

Jul. 4, 1991 [DE] Fed. Rep. of Germany ....... 4122206

[51] Int. Cl.$^5$ ............................................. C07F 7/08
[52] U.S. Cl. ........................................................ 556/466
[58] Field of Search ........................................... 556/466

[56] References Cited

U.S. PATENT DOCUMENTS

| | | | |
|---|---|---|---|
| 3,830,780 | 8/1974 | Nitzsche et al. | 220/46.5 R |
| 4,480,124 | 10/1984 | Mueller | 560/248 |
| 4,661,612 | 4/1987 | George et al. | 556/450 |
| 4,704,443 | 11/1987 | Lamont | 556/466 X |
| 4,962,221 | 10/1990 | Huntress et al. | 556/466 X |
| 5,104,999 | 4/1992 | Satoh | 556/466 |

FOREIGN PATENT DOCUMENTS

| | | | |
|---|---|---|---|
| 0061668 | 3/1982 | European Pat. Off. | |
| 0186736 | 9/1985 | European Pat. Off. | |
| 0424791 | 10/1990 | European Pat. Off. | |
| 1253178 | 4/1959 | France | |
| 2168439 | 1/1973 | France | |
| 235887 | 9/1990 | Japan | 556/466 |
| 0933491 | 8/1963 | United Kingdom | 556/466 |

*Primary Examiner*—Paul F. Shaver

[57] ABSTRACT

A process for purifying organopolysiloxanes, which comprises treating organopolysiloxanes after their preparation with an elemental metal. Impurities which are related to the preparation of organopolysiloxanes and cause changes in color, in particular during storage under the influence of heat, subsequent clouding, inhibition of catalysts, a lack of heat stability, a lack of dielectric strength or the formation of odors, especially after exposure to light, are removed by the process of this invention.

8 Claims, No Drawings

PROCESS FOR THE PURIFICATION OF ORGANOPOLYSILOXANES

The present invention relates to purified organopolysiloxanes and more particularly to a process for purifying already prepared organopolysiloxanes.

BACKGROUND OF THE INVENTION

The preparation of organopolysiloxanes from short-chain organo(poly)siloxanes is described in detail in W. Noll, Chemie und Technologie der Silicone (Chemistry and Technology of the Silicones), 2nd Edition 1968, Chapter 5.4. Even though the organopolysiloxanes are colorless, clear, odorless and inert, they may contain impurities which cause changes in color, in particular during storage under the influence of heat, subsequent clouding, inhibition of catalysts, for example during addition reactions with platinum, a lack of heat stability, a lack of dielectric strength or formation of odors, especially after exposure to light. Impurities occur not only when homogeneous catalysts, such as $PNCl_2$, are used, but are also present when heterogeneous catalysts, such as acid bleaching earth, are used.

In the conventional processes for preparing organopolysiloxanes, they contain impurities in extremely small amounts, however, these impurities have not been identified analytically.

The effects of the impurities can be eliminated in part by an after-treatment with an adsorbent, such as active charcoal. However, the adsorbents retain large amounts of the polyorganosiloxane, thereby resulting in a significant loss in yield. To date, it has not been possible to purify organopolysiloxanes contaminated with impurities which inhibit the addition reaction with platinum catalysts.

The preparation of odor-free silicone oils by equilibration of organopolysiloxanes in the presence of an acid catalyst and an added metal is described in DD-A-240 897 (H. Krönig et al., published on Nov. 19, 1986 for VEB Chemiewerk Nünchritz, GDR). The unpleasant smell associated with the silicone oil is said to be eliminated by the added metal. However, if a heterogeneous catalyst is used, a mixture of catalyst and added metal is obtained which can scarcely be reprocessed and can present disposal problems. The amount of metal required is therefore high and the catalyst can only be reused after an expensive treatment, if at all. Homogeneous acid catalysts react with the added metal and are not suitable for this process.

Therefore, it is an object of the present invention to provide a process for purifying organopolysiloxanes. Another object of the present invention is to provide a process for purifying organopolysiloxanes regardless of their process of preparation. A further object of the present invention is to provide a process for preparing organopolysiloxanes in which a heterogeneous catalyst can be used several times and in which no disposal problems arise.

SUMMARY OF THE INVENTION

The foregoing objects and others which will become apparent from the following description are accomplished in accordance with this invention, generally speaking, by providing a process for the purification of organopolysiloxanes, in which the organopolysiloxanes are treated after their preparation with an elemental metal.

DESCRIPTION OF THE INVENTION

The invention is suitable for the purification of any desired organopolysiloxanes. The organopolysiloxanes preferably have the general formula

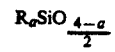

$$R_a SiO_{\frac{4-a}{2}}$$

in which R represents the same or different monovalent SiC-bonded $C_1$ to $C_{18}$-hydrocarbon radicals or monovalent substituted SiC-bonded $C_1$ to $C_{18}$-hydrocarbon radicals, and if appropriate one of the radicals R in the terminal units may represent functional radicals, and a is 0, 1, 2 or 3, with an average of from 1.8 to 2.2, and more preferably from 1.9 to 2.1.

Although this is not shown in the above formula, some of the radicals R can be replaced by hydrogen atoms bonded directly to silicon atoms. However, this is not preferred.

The radicals R preferably contain not more than 12 carbon atoms per radical. Examples of radicals represented by R are alkyl radicals, such as the methyl, ethyl, n-propyl, iso-propyl, n-butyl, iso-butyl, tert-butyl, n-pentyl, iso-pentyl, neo-pentyl and tert-pentyl radicals; hexyl radicals such as the n-hexyl radical; heptyl radicals, such as the n-heptyl radical; octyl radicals, such as the n-octyl radical and iso-octyl radicals, such as the 2,2,4-trimethylpentyl radical; nonyl radicals, such as the n-nonyl radical; decyl radicals, such as the n-decyl radical; dodecyl radicals, such as the n-dodecyl radical; alkenyl radicals, such as the vinyl and the allyl radicals; cycloalkyl radicals, such as the cyclopentyl, cyclohexyl and cycloheptyl radicals and methylcyclohexyl radicals; aryl radicals, such as the phenyl, and the naphthyl radicals; alkaryl radicals, such as the o-, m- p-tolyl radicals, xylyl radicals and ethylphenyl radicals; and aralkyl radicals, such as the benzyl radical and the $\alpha$- and $\beta$-phenylethyl radicals.

Examples of substituted radicals represented by R are cyanoalkyl radicals, such as the $\beta$-cyanoethyl radical, and halogenated hydrocarbon radicals, for example halogenoalkyl radicals, such as the 3-chloropropyl radical, the 3,3,3-trifluoro-n-propyl radical, the 2,2,2,2',2',2'-hexafluoroisopropyl radical and the heptafluoroisopropyl radical, and halogenoaryl radicals, such as the o-, m- and p-chlorophenyl radical, the 3-aminopropyl radical, the 3-(2-aminoethylamino)propyl radical, the 3-thiopropyl radical or propyl radicals which contain polyglycols, such as ethylene glycol or propylene glycol or mixed polyglycols, bonded to the propyl radical in the 3-position.

One of the R radicals in the terminal units, that is in the groups of the above general formula where a represents 3, can be a functional radical, for example a condensable group, such as the OH, an alkoxy, an acetoxy or an amino group, a group which can be added on, such as the vinyl group or the hydrogen atom, or a $C_1$ to $C_{18}$-hydrocarbon radical which carries a condensable group or a group which can be added on.

The process of this invention is also suitable for the purification of organopolysiloxanes having glycol ether radicals and block or copolymers of organosiloxane units and glycol ether units, such as ethylene glycol ether units and propylene glycol ether units.

The process of this invention is particularly suitable for the purification of linear or cyclic organopolysiloxanes in which the radicals R represent methyl radicals, phenyl radicals or vinyl or H radicals, and if appropriate OH, vinyl or H radicals in the end groups and which have a viscosity of from 0.5 to $10^6$ mm$^2$/s at 25° C.

Metals which may be employed in the process of this invention are magnesium, titanium, zirconium, hafnium, vanadium, niobium, tantalum, chromium, molybdenum, tungsten, manganese, iron, cobalt, nickel, copper, silver, zinc, cadmium, aluminum, silicon, tin, lead, antimony and bismuth, in which silver, iron, aluminum, chromium, nickel, cobalt and in particular copper are preferred.

The temperature, time and other reaction parameters employed in the process of this invention, which is carried out after the organopolysiloxanes have been prepared as an after-treatment, can be freely chosen and is independent of the conditions for preparing the organopolysiloxanes. The elemental metal can therefore also be added in any desired form. Because of their large surface areas, powders having a particle size of up to 1 mm or bronzes react most readily with the organopolysiloxanes. These forms of addition have proven particularly suitable for iron and aluminum. After the purification, the powders or bronzes can easily be removed, for example by means of a filter press.

The metal can also be added as granules or filings. The advantage here is that the metal can be easily separated, for example by decanting from the liquid organopolysiloxane. The granules, powder, bronze or the filings can be used to treat several batches.

Since organopolysiloxanes prepared by the more conventional equilibration processes usually contain only extremely small amounts of impurities, very small amounts of metal are required in the after treatment of the prepared organopolysiloxanes. About 0.001 to 0.1% by weight of metal, based on the weight of the organopolysiloxane, is preferably added.

These amounts of metal can be recovered almost completely. The loss in product, that is to say in organopolysiloxane, can be kept extremely low by washing the metal or solid reaction product of metal and the impurity from the organopolysiloxane with a highly volatile starting compound, such as a cyclic polysiloxane, and subsequently removing the starting compound in vacuo.

If metals which react particularly well with the impurities are used, such as copper and nickel, the process according to this invention can also be carried out with metal installations having a relatively low surface area. In this procedure, the organopolysiloxane is brought into contact with the elemental metal. The term metal installations includes, for example, pipes, baffles, grids or screens of metal or metal in the form of a fixed bed reactor in which the metal is present as sheet metal, chips or packing of any desired shape.

Copper is particularly suitable for the metal installations, since a dark deposit forms on the metal surface after a prolonged treatment time with contaminated organopolysiloxane. The dark deposit adheres only slightly to the substrate and will partly detach itself. In this manner, the metal surface is at least partially exposed again. The deposit remaining on the metal surface is not very dense, so that the impurities of the organopolysiloxane nevertheless react with the underlying metal and are removed. The metal is thus consumed only at the rate at which it reacts with the impurities to be removed from the organopolysiloxane. The detached deposit can be easily removed from the organopolysiloxane by filtration.

It is particularly suitable to use metal installations for a continuous process procedure in which the organopolysiloxanes are passed over the metal for a prolonged period of time.

The process of this invention can be carried out at 15° to 280° C., and more preferably at 50° to 280° C. At higher temperatures, the properties of the organopolysiloxanes may become more unfavorable again because they start to decompose. The temperature required depends, inter alia, on the metal, on its surface area, on the amount and nature of the impurities, on the treatment time and on the organopolysiloxane. In most cases, however, the temperature ranges from about 80° to 200° C.

The treatment time may range from 1 minute to several days, but preferably ranges from 1 minute to 1 hour. As expected, it is shorter at a higher temperature. The above factors which influence the temperature also determine the treatment time.

In a preferred embodiment, after the catalyst used in the preparation of the organopolysiloxanes has been removed or neutralized, the organopolysiloxanes which are still in a heated state are treated with the elemental metal. In this procedure, the metal can be stirred together with the organopolysiloxane as a powder, bronze, granules or filings. However, the heated organopolysiloxane is preferably passed slowly over metal installations, in particular metal installations containing copper.

In the following examples, unless otherwise stated, (a) all quantities are by weight; (b) all pressures are 0.10 MPa (absolute); and (c) all temperatures are 25° C.

EXAMPLE 1

About 0.5 g of copper powder was added to 1000 g of a polydimethylsiloxane having trimethylsilyl end groups, which had a viscosity of 102 mm$^2$/s at 25° C., in a heated glass flask and the mixture was stirred at 100° C. for 20 minutes. After cooling, all the solids were filtered off. The silicone oil was practically unchanged in regard to viscosity, refractive index and volatility.

The untreated oil employed above had no odor. The oil was placed in sunlight in a half-filled transparent glass bottle for 4 hours. A strong, unpleasant odor developed.

The oil treated with copper powder and exposed to light under the same conditions was odor free. Even after being exposed several times for the above exposure time, the oil had no odor.

EXAMPLE 2

The polydimethylsiloxane can be added as a plasticizer in the preparation of addition-crosslinking two-component silicone compositions (RTV-2). An essential feature of the quality of the RTV-2 product is its vulcanization properties or its reactivity, which is determined by means of the so-called pot life. The pot life is tested on 100 g of the two-component mixture, consisting of 80 g of component A and 40 g of component B, at 90° C. in a circulating air drying cabinet. The pot life is reached when vulcanization first appears.

When the pot life of an RTV-2 composition in which the A component consists of 0.42 part of a platinum complex having a 1% Pt content as the catalyst and 2.12 parts of a polydimethylsiloxane containing vinyl groups as the inhibitor (viscosity 50 mm$^2$/s) and also 850 parts of untreated silicone oil which was employed in Example 1 and the B component consists of 55 parts of a polydimethylsiloxane which contains vinyldimethylsilyl end groups and has a viscosity of 20,000 mm²/s, 18.5 parts of an SiH-containing polydimethylsiloxane as the cross-linking agent (viscosity 200 mm²/s), 1.8 g of a pigment paste for coloring and 110 parts of untreated silicone oil which was employed in Example 1 was measured in accordance with the above test, the pot life obtained at 90° C. was 27 minutes (specifications: 11 to 17 minutes). The untreated oil contained impurities which inhibited the addition reaction and could not be used as plasticizer for RTV-2.

When the silicone oil from Example 1 was employed in the test described above after treatment with copper powder, the pot life was 12 minutes. The purified oil was suitable as a plasticizer for RTV-2.

EXAMPLES 3 to 8

Example 1 was repeated, except the polydimethylsiloxane was treated with the amounts of metal powder shown in Table 1. The time of exposure of the treated oil to light was 20 hours.

TABLE 1

| Example | Metal powder/amount | Result |
|---|---|---|
| 3 | 5.0 g of iron powder, Merck, 150 μm | no odor |
| 4 | 0.1 g of copper powder, Merck, Art. 2703 | no odor |
| 5 | 2.0 g of chromium powder, Merck, Art. 12097 | slight odor |
| 6 | 0.02% of copper powder, Merck, Art. 2703 | no odor |
| 7 | 0.05% of nickel powder, 99.7%, 3 μm, Aldrich | no odor |
| 8 | 0.05% of cobalt powder, 99,8%, 2 μm, Aldrich | no odor |

EXAMPLES 9 to 15

About 1000 g of a polydimethylsiloxane having trimethylsilyl end groups and a viscosity of 100 mm²/s at 25° C. was stirred in a heated glass beaker. A copper sheet having a surface area of 200 cm² was suspended in the substance at the temperatures and times shown in Table II.

TABLE II

| Example | Cu sheet | Treatment temperature (°C.) | Treatment time (s) | Odor after exposure to light (30 hrs. of daylight) |
|---|---|---|---|---|
| 9 | — | 160 | 180 | strong odor |
| 10 | 1 | 160 | 180 | slight odor |
| 11 | 1 | 160 | 900 | no odor |
| 12 | 1 | 200 | 180 | no odor |
| 13 | 1 | 200 | 900 | no odor |
| 14 | 2 | 200 | 180 | no odor |
| 15 | 2 | 200 | 900 | no odor |

1 The copper sheet is always the same sheet, which was employed in the next experiment without cleaning. In Example 10, the suface of the copper sheet was bright.
2 This copper sheet already had a dark deposit on the surface, which adhered poorly in relatively thick layers. The deposit was formed in treating 100 kg of the polydimethylsiloxane used in Examples 9 to 15.

COMPARISON EXAMPLES 16 to 19

About 0.5% by weight of one of the adsorbent substances CuO, MgO, ZnO and active charcoal was added in each case to 1000 g of the polydimethylsiloxane used in Examples 9 to 15, and the mixture was heated to 100° C., stirred for 30 minutes, cooled to 50° C., filtered and stored in sunlight for 8 hours.

Compared with the untreated sample, the odor level of the above samples was reduced, but was still too strong. (Stronger than Example 5.)

We claim:

1. A process for purifying an organopolysiloxane, which comprises treating the organopolysiloxane after its preparation with an elemental metal selected from the group consisting of iron, copper, nickel and silver.

2. The process of claim 1, in which the metal is added as a powder.

3. The process of claim 1, in which the metal is added in the form of granules or filings.

4. The process of claim 1, in which from 0.001 to 0.1% by weight of metal is added, based on the weight of the organopolysiloxane.

5. The process of claim 1, in which the organopolysiloxane is contacted with metal installations.

6. The process of claim 1 in which the metal is copper or nickel.

7. The process of claim 1 in which the treatment is carried out at 50° to 280° C.

8. A process for purifying an organopolysiloxane which comprises preparing the organopolysiloxane in the presence of a catalyst, removing or neutralizing the catalyst and thereafter passing the organopolysiloxane over copper installations in a heated condition.

* * * * *